(12) United States Patent
Peschges et al.

(10) Patent No.: US 6,506,443 B1
(45) Date of Patent: Jan. 14, 2003

(54) METHOD AND DEVICE FOR APPLYING SURFACE-MODIFYING AUXILIARY SUBSTANCES TO WORKING AREA INTERIOR SURFACES OF DIE MOLDS

(75) Inventors: Klaus-Jürgen Peschges, Laudenbach (DE); Steffen Kosack, Hassloch (DE); Andreas Hartmann, Ilvesheim (DE); Günter Hofmann, Ladenburg (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/518,412

(22) Filed: Mar. 3, 2000

(30) Foreign Application Priority Data

Mar. 4, 1999 (DE) .......................... 199 09 477

(51) Int. Cl.⁷ .............................. B05D 7/22; B22C 3/00
(52) U.S. Cl. .................. 427/133; 427/134; 427/135; 427/154; 427/237; 427/238; 164/72
(58) Field of Search ................. 427/230, 237, 427/238, 248.1, 133, 135, 236, 239; 164/72; 264/39, 81

(56) References Cited

U.S. PATENT DOCUMENTS

| 3,978,908 | A | * | 9/1976 | Klaus et al. | 164/72 |
| 3,988,137 | A | * | 10/1976 | Goodwin | 65/26 |
| 4,186,164 | A | * | 1/1980 | Spivack | 264/81 |
| 4,775,554 | A | * | 10/1988 | Ponjee | 427/133 |
| 4,955,424 | A | * | 9/1990 | Takehisa et al. | 164/72 |
| 5,112,543 | A | * | 5/1992 | Thary | 264/51 |
| 5,603,984 | A | * | 2/1997 | Keim et al. | 427/133 |
| 5,965,076 | A | * | 10/1999 | Banks et al. | 264/219 |

\* cited by examiner

Primary Examiner—Shrive P. Beck
Assistant Examiner—Wesley Markham
(74) Attorney, Agent, or Firm—Kenyon & Kenyon

(57) ABSTRACT

A method of applying surface-modifying auxiliary substances to the working area interior surfaces of die molds for the production of molded products, in particular made of rubber or plastics. The auxiliary substance is supplied in the form of a gas or vapor to the interior surfaces of the die mold, which is integrated into the processing machine, and the gas or vapor is condensed there.

13 Claims, 1 Drawing Sheet

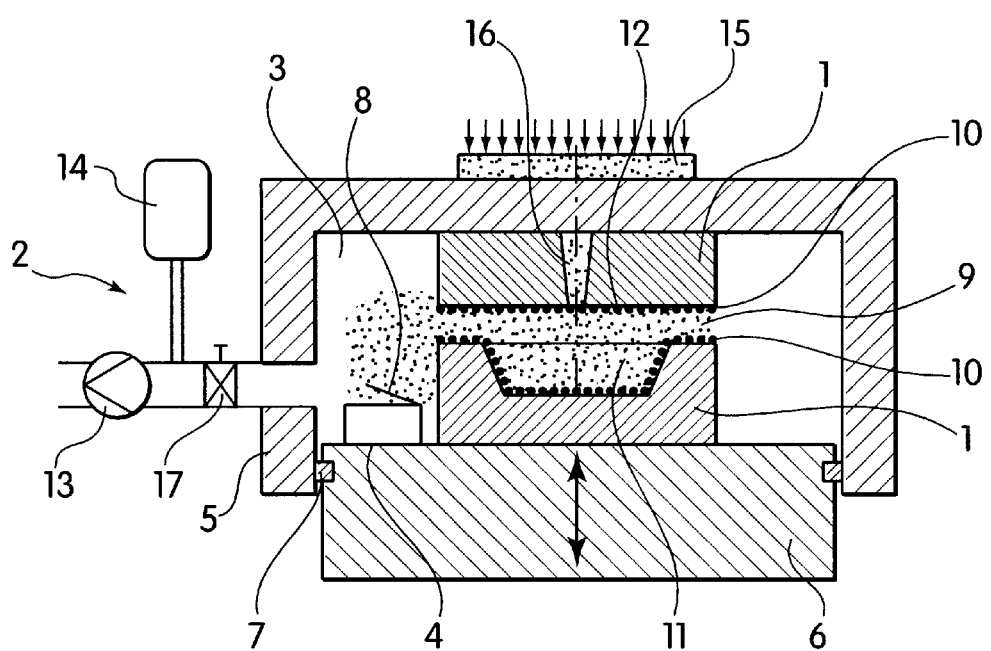
Figure

METHOD AND DEVICE FOR APPLYING SURFACE-MODIFYING AUXILIARY SUBSTANCES TO WORKING AREA INTERIOR SURFACES OF DIE MOLDS

BACKGROUND OF THE INVENTION

In the manufacture of molded products, particularly those made of rubber or plastics, the purity and properties of the working area interior surfaces of the die molds are extremely important. They influence the mold filling and especially the soiling of the mold. Measures can be taken in creation of the mold and with the product material used to retain a high purity during the manufacturing process. In addition, auxiliary substances are applied to the working area interior surfaces of the die molds. Thus, parting compounds, for example, are applied by hand to the interior surface of the mold with the help of cleaning cloths, by spraying or the like. It is a disadvantage here that the auxiliary substance is distributed unevenly over the die mold surface. Application of the auxiliary substance depends on the operating personnel and is not clearly reproducible. It is also a disadvantage that an unjustifiably long period of time is required to apply the auxiliary substance.

SUMMARY OF THE INVENTION

The object of the present invention is to remedy this situation and provide a method of applying auxiliary substances to the interior surfaces of die molds with which the greatest possible accuracy can be achieved in applying the auxiliary substance and which can be carried out inexpensively in the shortest possible amount of time. This method should contribute toward good mold filling and preventing soiling of the mold to the greatest extent. This should increase the useful lifetime of the mold.

This object is achieved with a method of applying surface-modifying auxiliary substances to the working area interior surfaces of die molds for producing molded products, in particular made of rubber or plastics according to the present invention by supplying the auxiliary substance in the form of a gas or vapor to the interior surfaces of the die mold which is integrated into the processing machine, and the gas or vapor is condensed there. It becomes superfluous to spray the auxiliary substance or apply it with wiping cloths or the like. The gas or vapor form of the auxiliary substance is preferably produced in vacuo. Even a partial vacuum can produce vaporized auxiliary substance. It can then be supplied to the interior surfaces of the die molds and condensed there.

An air flow can contribute toward a rapid and uniform distribution of the vaporized auxiliary substance onto the interior surfaces of the die molds. This flow can be achieved either by natural or forced flow.

One effective technique for promoting the condensation process is to increase the pressure. Controlled condensation on the mold surfaces can be achieved or supported in this way.

The auxiliary substance to be used is to be coordinated with the individual application. The auxiliary substance is selected according to the type of mold, the product to be molded and in particular the temperature to be used. It is preferably accommodated in a heatable depot which communicates with the opened die mold. It can be removed from the depot in portions. In the depot itself, the auxiliary substance may be in solid, liquid or gaseous form. Thus, the auxiliary substance may also be introduced into the depot in individual portions, e.g., in tablet form.

Depending on the product to be produced, the auxiliary substance is selected so that it is deposited on the interior surfaces of the die mold in liquid and/or solid form. For deposition in solid form, it is also possible to work with substances that sublime.

The thickness of the layer deposited on the interior surfaces can be predetermined. For example, it can be controlled by the duration of the condensation phase. With an appropriate adjustment of the individual process steps, extremely thin layers can be achieved.

It is possible with this method to apply a defined layer of the auxiliary substance to the mold before each mold filling operation. However, it is also possible to apply the layer after several mold filling operations in predetermined cycles. Finally, different auxiliary substances can be used with the individual cycles. The latter is readily possible by replacing the auxiliary substance in the depot.

The device for carrying out this method includes a vacuum system for generating the vacuum in the die mold and a depot for the auxiliary substance communicating with it. A very simple option is achieved when the vacuum system is integrated into the molding installation, with the vacuum chamber enclosing the die mold in an airtight manner.

BRIEF DESCRIPTION OF THE FIGURE

The FIG. 1 is a schematic representation of one embodiment of the invention.

DETAILED DESCRIPTION OF THE INVENTION

The figure shows the basic design of a die mold 1 having a vacuum system 2 and a vacuum chamber 3 enclosing die mold 1. Depot 4 for the auxiliary substance is also accommodated in vacuum chamber 3.

Vacuum chamber 3 has cylindrical part 5 and displaceable plunger 6. Both are sealed with respect to each other by gaskets 7. Depot 4 has seal 8 which is opened to release a certain quantity of vaporized auxiliary substance. The gas or vapor with the auxiliary substance spreads in vacuum chamber 3 when mold 1 is opened and depot 4 is opened, as indicated by the dots shown in the figure. Larger dots 10 shown on interior surfaces 11, 12, of the die mold indicate the layer deposited on interior surfaces 11, 12, of the die mold.

Vacuum system 2 includes vacuum pump 13 and buffer 14.

Product material 15 is to be injected into mold 1. When mold 1 is closed, product material 15 is injected through nozzle 16 into the interior of mold 1.

The individual process steps are carried out as follows: after material 15 has been injected into closed die mold 1, die mold 1 is opened and the finished product is removed. Valve 17 to vacuum system 2 is opened and a vacuum is produced inside vacuum chamber 3. This vacuum is based on the auxiliary substance in depot 4. The vacuum causes a predetermined amount of auxiliary substance to escape in the form of a gas or vapor from depot 4 after depot seal 8 is opened. This vapor 9 is deposited on interior surfaces 11 and 12 of die mold 1. This can be supported by cooling mold surfaces 11 and 12. It is also possible to control the pressure in vacuum chamber 3 so that the entering vapor condenses on surfaces 11 and 12. Through appropriate control of the vacuum in chamber 3, the opening time of depot 4 and cooling of interior surfaces 11 and 12, a defined, predetermined layer 10 can be achieved. Mold 1 is then closed and the next injection process can take place.

What is claimed is:

1. A method of applying surface-modifying auxiliary substances to the interior surfaces of a die mold comprising:

supplying an auxiliary substance in the form of a gas or vapor to the interior surfaces of the die mold which is integrated into a processing machine for performing said supplying step;

substantially-uniformly distributing the auxiliary substance onto the interior surfaces of the die mold; and condensing the gas or vapor onto the interior surfaces of the die mold by manipulating pressure within the interior surfaces of the die mold.

2. The method according to claim 1, wherein the gas or vapor form of the auxiliary substance is produced in vacuo.

3. The method according to claim 1, wherein the pressure of the interior surfaces of the die mold is increased to accelerate the condensation process.

4. The method according to claim 1, wherein the gaseous or vaporous auxiliary substance is distributed onto the working area interior surfaces of the die mold by natural and/or forced flow.

5. The method according to claim 1, wherein the gaseous or vaporous auxiliary substance is removed from a heatable depot which communicates with the interior of the die mold.

6. The method according to claim 5, wherein the auxiliary substance is added to the depot in individual portions.

7. The method according to claim 5, wherein the gaseous or vaporous auxiliary substance is deposited on the interior surfaces of the die mold in a liquid and/or a solid form.

8. The method according to claim 1, wherein the gaseous or vaporous auxiliary substance is removed from a depot in portions.

9. The method according to claim 1, wherein the gaseous or vaporous auxiliary substance is deposited on the interior surfaces of the die mold in a liquid and/or a solid form.

10. The method according to claim 1, wherein the thickness of a layer deposited on the interior surfaces is controlled by the duration of condensation.

11. The method according to claim 1, wherein the auxiliary substance is deposited in predetermined cycles.

12. The method according to claim 11, wherein individual cycles are carried out with different auxiliary substances.

13. The method according to claim 1, wherein the auxiliary substance is supplied to the interior surfaces of the die mold using a pressure differential between the interior surfaces of the die mold and a source of the auxiliary substance.

* * * * *